UNITED STATES PATENT OFFICE.

THOMAS A. EDISON, OF LLEWELLYN PARK, ORANGE, NEW JERSEY, ASSIGNOR TO EDISON STORAGE BATTERY COMPANY, OF WEST ORANGE, NEW JERSEY, A CORPORATION OF NEW JERSEY.

ALKALINE STORAGE BATTERY.

No. 879,612.     Specification of Letters Patent.     Patented Feb. 18, 1908.

Application filed June 29, 1904. Serial No. 214,653.

*To all whom it may concern:*

Be it known that I, THOMAS A. EDISON, residing at Llewellyn Park, Orange, county of Essex, State of New Jersey, have invented certain new and useful Improvements in Alkaline Storage Batteries, of which the following is a description.

In the operation of storage batteries with alkaline electrolytes, I find that in many cases excessive foaming takes place, and this is objectionable for practical reasons. In seeking for the cause of this foaming, I have discovered that it is probably due to the presence of organic matter, albuminous or gelatinous, since the introduction of almost microscopic quantities of albumen, for example, in the solution, enormously increases the foaming during the charging and discharging operations. The problem of eliminating or at least greatly reducing the foaming of the solution required patient investigation. I have discovered that this objection may be overcome by subjecting the alkaline solution to a special treatment, capable of being carried on commercially and at a low cost. This treatment consists in carefully filtering the alkaline solution, for example, caustic potash, through bone-black, which has been first purified by washing in a hot caustic potash solution and then washing with water. I find that when the alkaline solution is subjected to this treatment foaming is practically eliminated, or at least is reduced to such an extent as to be unobjectionable. I am not able to positively account for this special result, since after the alkaline solution has been filtered, as described, it may still contain relatively large amounts of albuminous or gelatinous matter, the presence of which, if the solution were not filtered, would result in excessive foaming. One hypothesis, which has occurred to me, to explain the apparent paradox here presented, is that the foaming may be due to microscopic scales present in most albuminous and gelatinous matter, and which may be removed by the filtering operation, since, as is well known, purified bone-black permits of an excessively perfect filtration. Whether this is the true explanation of the result which takes place or not, it is a fact that by subjecting the alkaline solution to the treatment described, the objectionable foaming on the passage of the current through said solution is practically eliminated.

Having now described my invention, what I claim as new therein, and desire to secure by Letters Patent is as follows:

1. In a storage battery, the combination with suitable active materials, of a practically non-foaming alkaline electrolyte obtained by filtration of an alkaline solution through a filtering medium of very fine porosity, substantially as set forth.

2. In a storage battery, the combination with suitable active materials, of a practically non-foaming alkaline electrolyte obtained by filtration, of an alkaline solution through a filtering medium containing free carbon, substantially as set forth.

3. In a storage battery, the combination with suitable active materials, of a practically non-foaming alkaline electrolyte obtained by filtration of an alkaline solution through bone-black, substantially as set forth.

4. In a storage battery, the combination with suitable active materials, of a practically non-foaming alkaline electrolyte obtained by filtration of an alkaline solution through bone-black previously subjected to the purifying effect of a hot caustic solution followed by washing with water, substantially as set forth.

5. In a storage battery, the combination with suitable active materials, of an alkaline electrolyte substantially free from albuminous or gelatinous matter in a condition to cause foaming, substantially as set forth.

This specification signed and witnessed this 24 day of June 1904.

THOS. A. EDISON.

Witnesses:
    FRANK L. DYER,
    MINA C. MACARTHUR.